(12) United States Patent
Park et al.

(10) Patent No.: US 9,510,244 B2
(45) Date of Patent: Nov. 29, 2016

(54) APPARATUS AND METHOD FOR CONTROLLING CELL RESELECTION TIMER IN COMMUNICATION SYSTEM

(71) Applicant: Samsung Electronics Co., Ltd., Gyeonggi-do (KR)

(72) Inventors: Jung-Woo Park, Gyeonggi-do (KR); Ki-Hyun Do, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/849,168

(22) Filed: Sep. 9, 2015

(65) Prior Publication Data

US 2016/0135092 A1   May 12, 2016

(30) Foreign Application Priority Data

Nov. 10, 2014 (KR) .......................... 10-2014-0155491

(51) Int. Cl.
*H04W 36/00* (2009.01)
(52) U.S. Cl.
CPC .............................. *H04W 36/0005* (2013.01)
(58) Field of Classification Search
CPC ........... H04W 36/00; H04W 36/0022; H04W 36/30; H04W 36/18; H04W 36/08; H04W 36/12; H04W 36/14; H04W 36/32; H04W 36/0083; H04W 36/0055
USPC .......................................... 455/436, 437, 438
See application file for complete search history.

(56) References Cited

U.S. PATENT DOCUMENTS

| | | | |
|---|---|---|---|
| 9,008,659 B1* | 4/2015 | Choi | H04W 36/04 370/331 |
| 2006/0199591 A1 | 9/2006 | Klatt | |
| 2006/0258386 A1 | 11/2006 | Jeong et al. | |
| 2008/0220784 A1 | 9/2008 | Somasundaram et al. | |
| 2009/0247161 A1 | 10/2009 | Pani et al. | |
| 2010/0195618 A1 | 8/2010 | Park et al. | |
| 2010/0240356 A1 | 9/2010 | Lee et al. | |
| 2010/0240367 A1 | 9/2010 | Lee et al. | |
| 2011/0136530 A1 | 6/2011 | Deshpande | |
| 2012/0252452 A1 | 10/2012 | Martin et al. | |
| 2012/0322447 A1 | 12/2012 | Ramachandran et al. | |
| 2013/0188503 A1 | 7/2013 | Anepu et al. | |
| 2014/0036874 A1 | 2/2014 | Jeong et al. | |
| 2015/0304918 A1* | 10/2015 | Jung | H04W 48/20 455/436 |

FOREIGN PATENT DOCUMENTS

| | | |
|---|---|---|
| GB | 2482820 | 4/2014 |
| KR | 10-2006-0096172 | 9/2006 |
| KR | 10-2009-0033146 | 4/2009 |
| KR | 10-2009-0129448 | 12/2009 |
| KR | 10-2010-0016494 | 2/2010 |
| KR | 10-2011-0011554 | 2/2011 |
| KR | 10-2013-0025893 | 3/2013 |
| KR | 10-2014-0010698 | 1/2014 |
| KR | 10-2014-0017883 | 2/2014 |

* cited by examiner

*Primary Examiner* — Temica M Beamer
(74) *Attorney, Agent, or Firm* — The Farrell Law Firm, P.C.

(57) ABSTRACT

A method for operating of a terminal in a communication system is provided. The method includes receiving first information for cell reselection, reconfiguring an expiration time of a cycle of a timer of the terminal based on the received first information for cell reselection, and determining second information for cell reselection at the reconfigured expiration time of the cycle of the timer of the terminal for cell reselection.

20 Claims, 11 Drawing Sheets

APPARATUS AND METHOD FOR CONTROLLING CELL RESELECTION TIMER IN COMMUNICATION SYSTEM

PRIORITY

The present application claims priority under 35 U.S.C. §119(a) to Korean Patent Application Serial No. 10-2014-0155491, which was filed in the Korean Intellectual Property Office on Nov. 10, 2014, the entire disclosure of which is incorporated herein by reference.

BACKGROUND

1. Field of the Disclosure

The present disclosure relates generally to an apparatus and method for use in a communication system, and more particularly, to an apparatus and method for reselecting as cell of a mobile terminal in a communication system.

2. Description of the Related Art

According to the cell reselection method proposed by the $3^{rd}$ Generation Partnership Project (3GPP) standard (3GPP TS 25.304), a terminal measures the quality of a serving cell, compares the measured quality and a parameter given by a network, when the quality is less than or equal to a reference value, measures neighboring cells, ranks the serving cell and the neighboring cells according to the result of measured quality, creates a ranking list, determines a top-ranked cell in the ranking list, and selects the determined top-ranked cell as a candidate cell for cell reselection. When the candidate cell is a neighboring cell, a timer for cell reselection (Treselection) starts and the candidate cell is reselected when the ranking of the candidate cell is higher than that of the serving cell, until the timer for cell reselection expires. The cell reselection process with the candidate cell is possible when the terminal is in an activation state, but when the terminal is in a sleeping state at the time for cell reselection, the cell reselection is not possible and a delay in cell reselection occurs.

SUMMARY

The present disclosure has been made to address at least the above mentioned problems and/or disadvantages and to provide at least the advantages described below.

An aspect of the present disclosure is to provide an apparatus and method for optimizing a timer for cell reselection in a wireless communication system.

Another aspect of the present disclosure is to provide an apparatus and method for determining an expiration time of a timer for cell reselection in a wireless communication system.

In accordance with an aspect of the present disclosure, there is provided a method for operating of a terminal in a communication system. The method includes receiving timer information for cell reselection, reconfiguring an expiration time of a cycle of a timer of the terminal based on the received timer information for cell reselection, and setting information for cell reselection at the reconfigured expiration time of the cycle of the timer of the terminal for cell reselection.

In accordance with an aspect of the present disclosure, there is provided a terminal in a communication system. The terminal includes a receiver configured to receive timer information for cell reselection and a controller configured to reconfigure an expiration time of a cycle of a timer of the terminal based on the received timer information for cell reselection, and set information for cell reselection at the reconfigured expiration time of the cycle of the tinier of the terminal for cell reselection.

In accordance with an aspect of the present disclosure, there is provided a System on Chip (SoC) for reselecting a cell of a terminal in a communication system. The SoC includes a receiver module configured to receive timer information for cell reselection and a controller module configured to reconfigure an expiration time of a cycle of a timer of the terminal based on the received timer information for cell reselection, and set information for cell reselection at the reconfigured expiration time of the cycle of the timer of the terminal for cell reselection.

The present disclosure provides a terminal that uses a method for reselecting a cell of a mobile to signal in a communication system. The terminal receives timer information from a base station. The timer information is used to rank a serving cell that is being used by the terminal with neighboring cells. If the serving cell ranks greater than the neighboring cell, the terminal continues to use the serving cell for communicating with the base station. Conversely, if the serving cell ranks less than the neighboring cell, the terminal use the neighboring cell for communicating with the base station.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, various embodiments of the present disclosure will be explained with reference to the accompanying drawings. In the following description, detailed descriptions of well-known functions or configurations will be omitted since they would unnecessarily obscure the subject matters of the present invention.

Hereinafter, technology for controlling a timer for cell reselection according to the present disclosure will be explained. In the following description, a terminal includes a mobile communication terminal in addition to a cellular phone or a smart phone.

Figure 1:
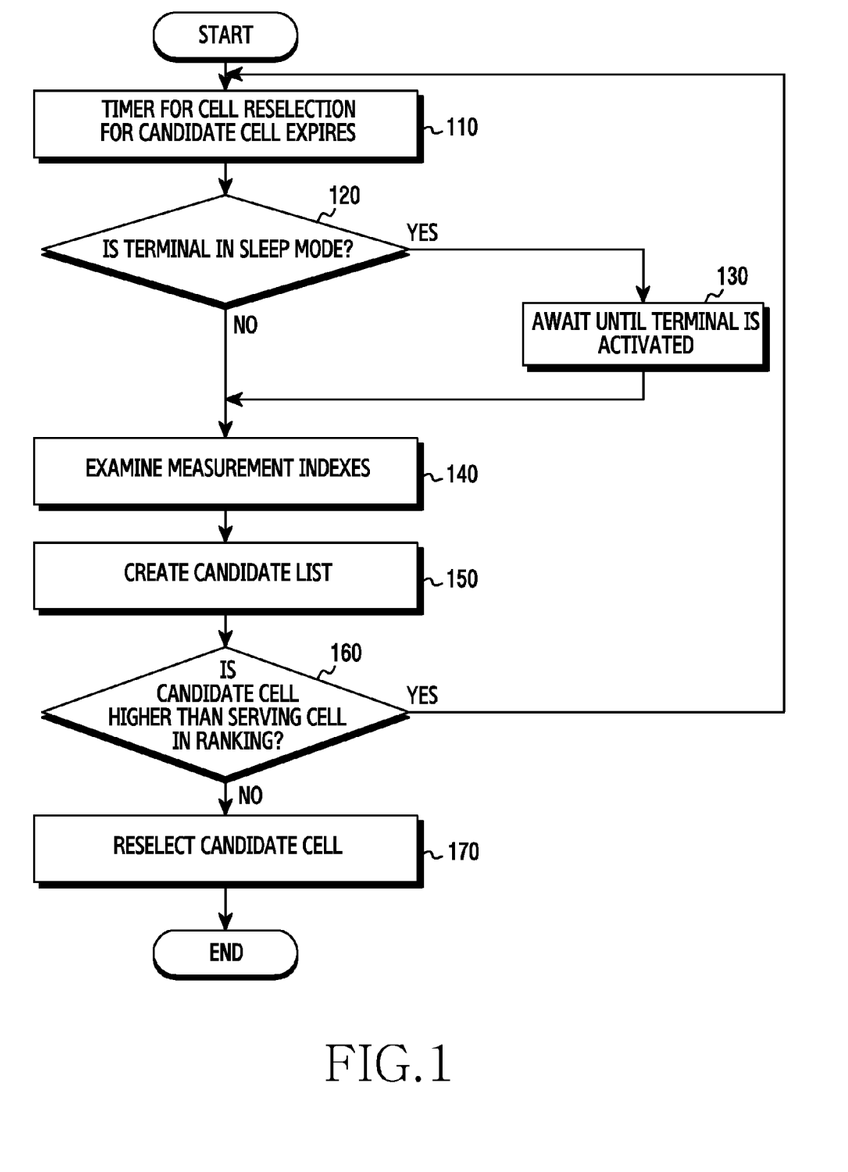
FIG. 1 is a flowchart illustrating a method for a cell reselection process, according to an embodiment of the present disclosure.

FIG. 1 is a flowchart illustrating a method for a cell reselection process, according to an embodiment of the present disclosure.

In step 110, the terminal determines whether a timer information for cell reselection (Treselection) for a candidate cell. The timer information for cell reselection is received from a network and is used to adjust a time for cell reselection. A length of the timer for cell reselection can be adjusted by multiplying the timer for cell reselection by a scaling factor according to Inter Radio Access Technology (RAT), Inter Frequency, and Mobility, and the usable scaling factor is shown in Table 1 presented below:

TABLE 1

| | Scaling Factor |
|---|---|
| Inter Frequency | Inter-Frequency Scaling Factor for Treselection |
| Inter RAT | Inter-RAT Scaling Factor for Treselection |
| High Mobility | Speed dependent Scaling Factor for Treselection |

In step 120, the terminal determines whether the terminal is in a sleep mode. When the terminal is in the sleep mode, the terminal does not search for a base station to save power and thus is not able to reselect a cell in the sleep mode. If it is determined that the terminal is in the sleep mode, the terminal waits until it is activated (in step 130), and, if it is determined that the terminal is not in the sleep mode, the terminal proceeds to step 140 to examine measurement indexes.

In step 140, the terminal determines a condition for cell reselection. For example, the terminal measures a quality of a serving cell and compares the measured quality and a parameter received from a network. When the measured quality of the serving cell is less than or equal to a reference value, the terminal examines measurement indexes regarding neighboring cells.

In step 150, the terminal ranks the serving cell and the neighboring cells according to the examined measurement indexes. The measurement indexes may utilize an index such as a strength and quality of signals, and the terminal generates a candidate list according to the values of the measurement indexes. The top-ranked cell in the candidate list becomes a candidate cell for cell reselection.

In step 160, the terminal compares the ranking of the candidate cell and the ranking of the serving cell. When the ranking of the serving cell is higher than the ranking of the candidate cell, the current sewing cell is maintained, and, thus, the candidate cell is not selected. When the ranking of the serving cell is lower than the ranking of the candidate cell, the terminal proceeds to step 170 and the candidate cell is selected.

Figure 2:
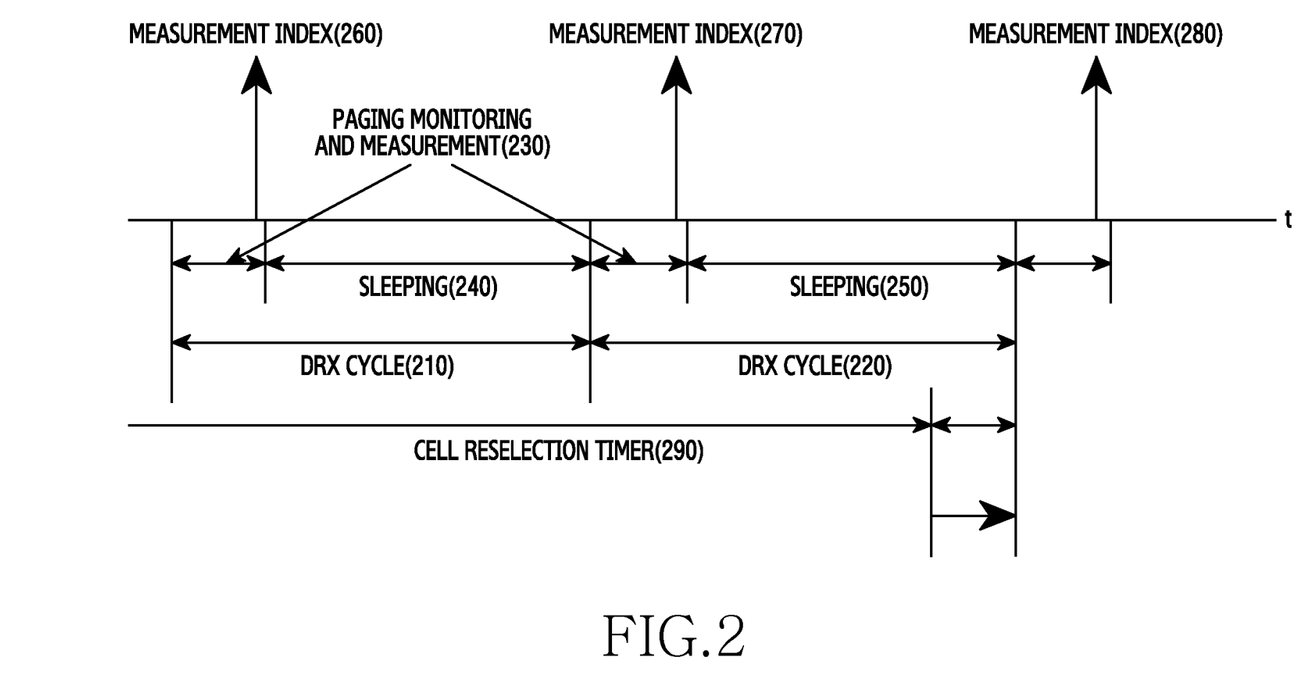
FIG. 2 is a diagram illustrating an example of an operation of a timer for cell reselection in a communication system, according to y an embodiment of the present disclosure.

FIG. 2 is a diagram illustrating an example of an operation of a timer for cell reselection in a communication system, according to an embodiment of the present disclosure.

Referring to FIG. 2, a correlation between two discontinuous reception (DRX) cycles 210 and 220, two sleeping times 240 and 250, a paging monitoring and measurement 230, three measurement index examining operations 260, 270, and 280, and a cell reselection timer 290 is illustrated.

In an idle state, the terminal enters a sleeping state (e.g., at sleeping times 240 and 250) to reduce power consumption, and is periodically woken up according to the DRX cycles 210 and 220 received from a network, and performs the paging monitoring and measurement 230. The DRX cycles 210 and 220 may include the paging monitoring and measurement mode 230 and the sleeping times 240 and 250. The terminal uses measurement index values (e.g., obtained at the measurement index examining operations 260, 270, and 280) to determine a condition for cell reselection. In FIG. 2, the timer 290 for cell reselection expires before the second DRX cycle 220 ends. Therefore, the final measurement value that the terminal uses to determine the condition for cell reselection is a value of a measurement index obtained at a second indexing examining operation 260. When the timer for cell reselection does not expire, the terminal does not reselect a cell and enters the sleeping states, at sleeping tunes 240 and 250. When the terminal is in the sleeping states and the timer for cell reselection expires, the cell reselection operation is not performed due to the powered-down Application Processor (AP)/Communication Processor (CP), even after the timer expires, and a delay in cell reselection occurs until the next wake-up time arrives according to the DRX cycles 210, 220. In order to reduce the delay in cell reselection, the timer for cell reselection should be optimized or an expiration time of the tuner for cell reselection may be determined.

Figure 3:
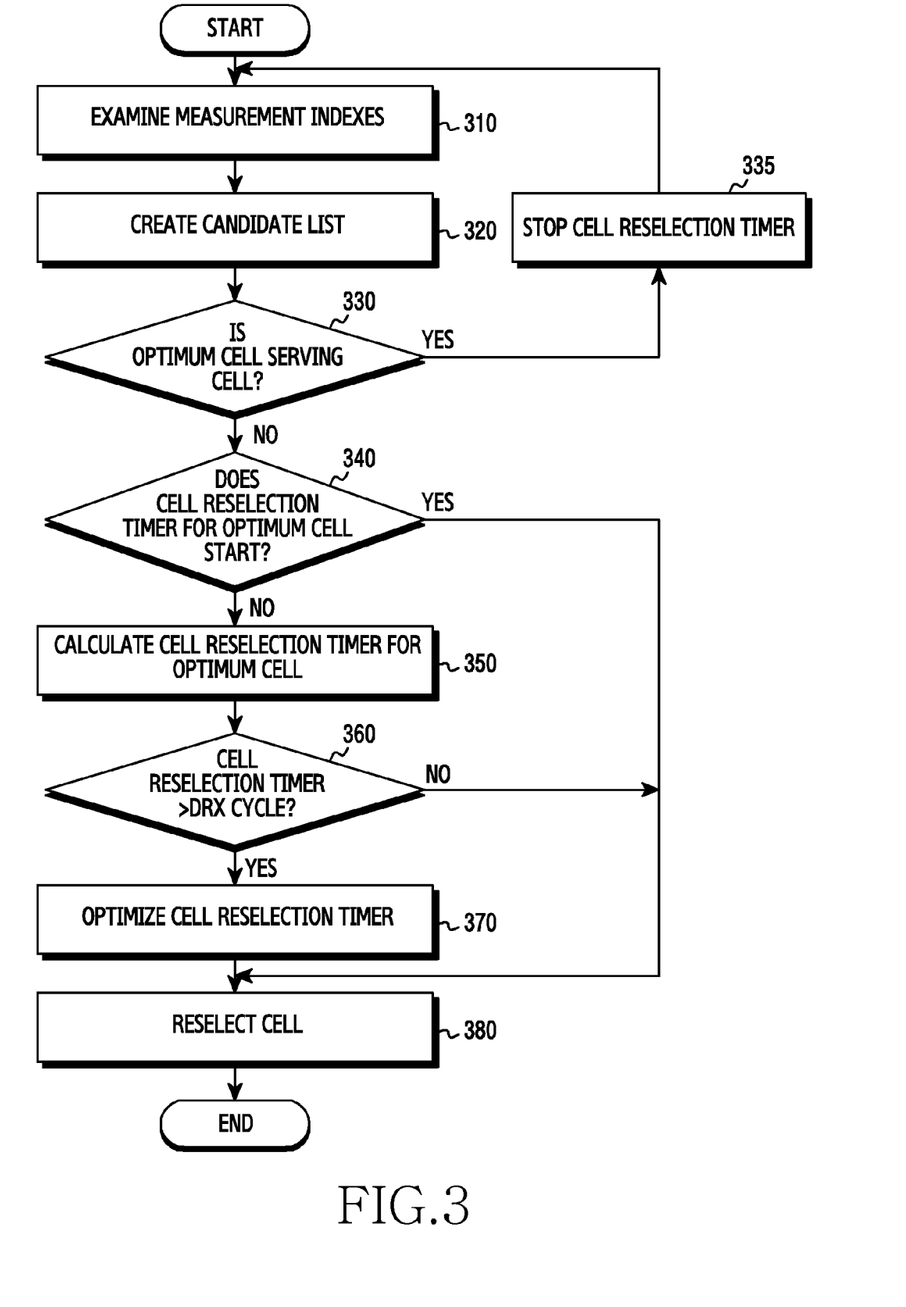
FIG. 3 is a flowchart illustrating a method for optimizing a timer for cell reselection, according to an embodiment of the present disclosure.

FIG. 3 is a flowchart illustrating a method for optimizing a timer for cell reselection, according to an embodiment of the present disclosure.

In step 310, the terminal examines measurement indexes. The terminal measures quality of a serving cell and compares the measured quality and a parameter received from a network. When the measured quality of the serving cell is less than or equal to a reference value, the terminal examines the measurement indexes regarding neighboring cells.

In step 320, the terminal ranks the serving cell and the neighboring cells according to examined measurement indexes. The measurement index may utilize an index such as a strength and quality of signals, and the terminal generates a candidate list according to the values of the examined measurement indexes. The top-ranked cell in the candidate list becomes a candidate cell for cell reselection.

In step 330, the terminal compares the ranking of the candidate cell and the ranking of the serving cell. When the ranking of the serving cell is higher than the ranking of the candidate cell, the terminal does not perform the cell reselection operation, and the current serving cell is maintained, and the terminal proceeds to step 335 to stop a timer for cell reselection. When the ranking of the serving cell is lower than the ranking of the candidate cell, the terminal selects the top-ranked candidate cell from among the candidate cells as an optimum cell, in step 340.

In step 340, the terminal also determines whether a timer for cell reselection for the optimum cell starts. When the timer for cell reselection for the optimum cell starts, the terminal is not able to adjust the timer for cell reselection and, thus, proceeds to step 380 and reselects a cell. When the timer for cell reselection for the optimum cell does not start, the terminal proceeds to step 350 and calculates the timer for cell reselection for the optimum cell.

In step 360, the terminal compares the time of the timer for cell reselection and the cycle of DRX. When the time of the timer for cell reselection is less than the cycle of the DRX, the timer for cell reselection may expire before the cycle of the DRX expires. Therefore, it is not necessary to adjust the timer for cell reselection. When the time of the timer for cell reselection is longer than the cycle of the DRX, the terminal proceeds to step 370 to optimize the timer for cell reselection.

When optimization is completed in step 370, the terminal reselects a cell in step 380.

Figure 4:
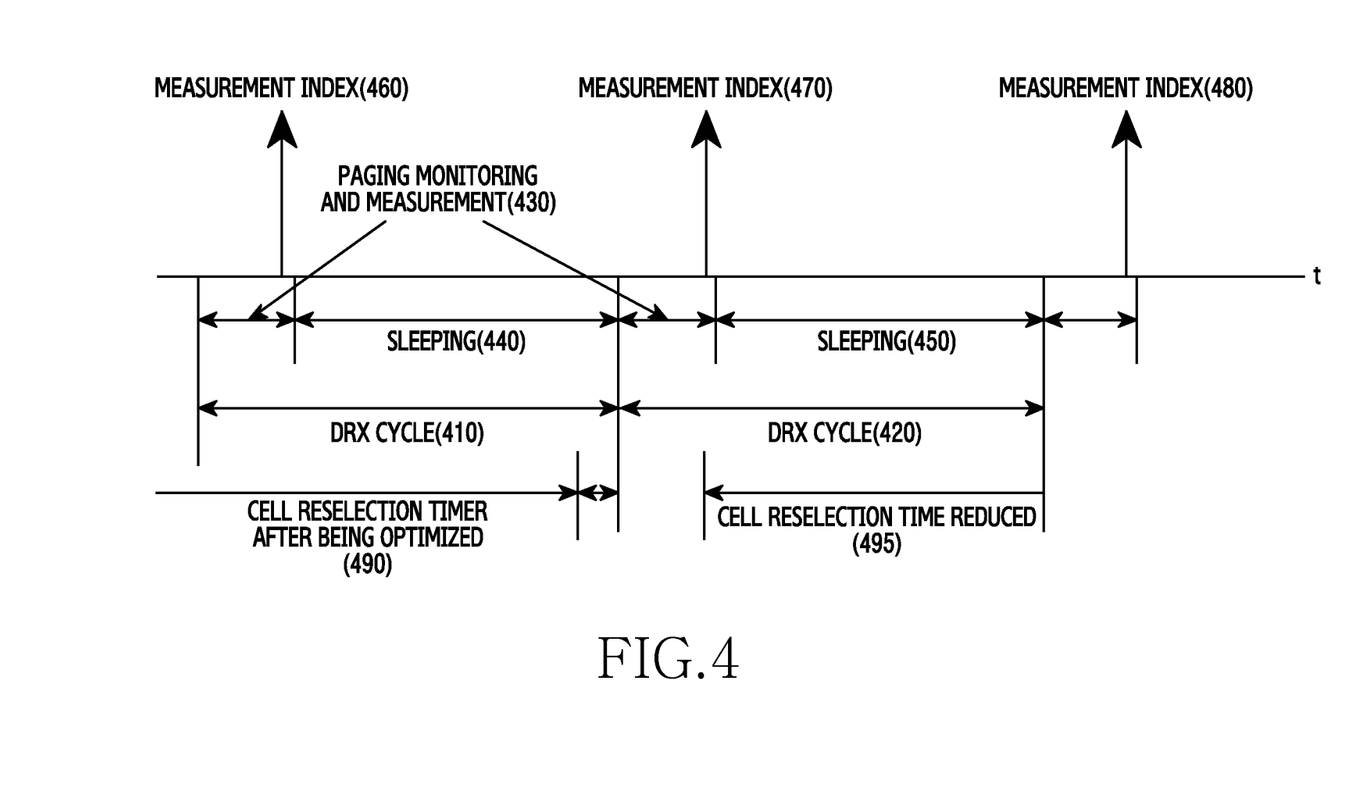
FIG. 4 is a diagram illustrating an example of an operation of an optimized timer for cell reselection, according to an embodiment of the present disclosure.

FIG. 4 is a diagram illustrating an example of an operation of an optimized timer for cell reselection, according to an embodiment of the present disclosure.

Referring to FIG. 4, a correlation between two DRX cycles 410 and 420, two sleeping times 440 and 450, a paging monitoring and measurement 430, three measurement index examining operations 460, 470, and 480, and a cell reselection timer 490 is shown.

Referring to FIG. 4, the cell reselection timer 490 of the terminal may be optimized and may expire before the DRX cycle 410 expires. Since the cell reselection timer 490 expires during the sleeping time 440 of the first DRX cycle 410 before the second DRX, cycle 420, the terminal may perform the paging monitoring and measurement 430 to reselect a cell before a second measurement index 470. When the terminal does not optimize the cell reselection timer, the cell reselection timer 490 may expire during the sleeping time 450 of the second DRX cycle 420, and, at that time, the terminal does not perform the paging monitoring and measurement 430. The terminal reselects a cell in the next wake-up time of the next DRX cycle, e.g., the next DRX cycle 410. Therefore, the time required to reselect a cell can be reduced by as much as a difference between the expiration time of the DRX cycle 420 and the time of measurement index 470 when the optimized timer for cell reselection is used in comparison with the case in which the optimized timer is not used. In FIG. 4, this reduction in time for reselecting a cell is illustrated by reference number 495.

Figure 5:
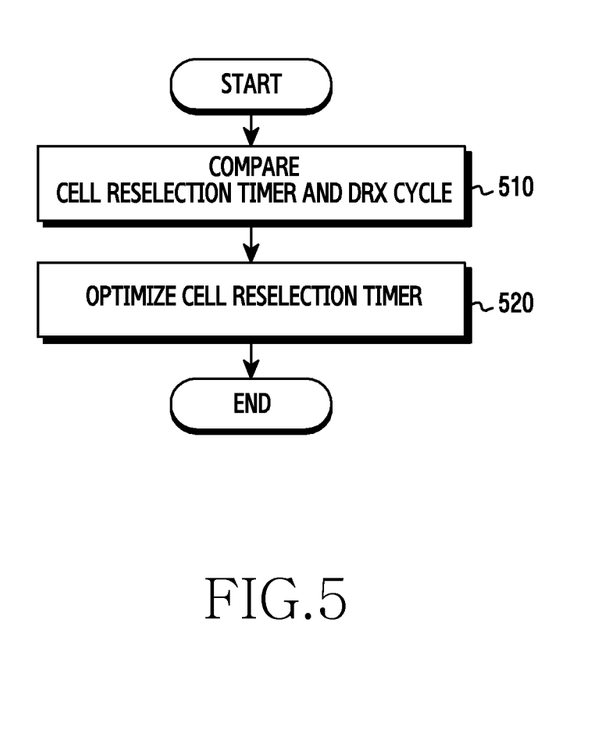
FIG. 5 is a flowchart illustrating a method for optimizing a timer for cell reselection, according to an embodiment of the present disclosure.

FIG. 5 is a flowchart illustrating a method for optimizing a timer for cell reselection, according to an embodiment of the present disclosure.

In step 510, the terminal compares the cycle of a timer for cell reselection and a DRX cycle. When the result of comparing the cycle of the timer for cell reselection and the DRX cycle satisfies Equation (1) presented below, the terminal proceeds to step 520 to optimize the timer for cell reselection:

$$Treselection > DRXcycle \quad (1)$$

Treselection is a length of a timer cycle for cell reselection, and DRXcycle is a length of a cycle of DRX. When the length of the timer cycle for cell reselection is greater than the length of the cycle of the DRX, the timer for cell reselection is optimized.

When the cycle of the timer for cell reselection satisfies Equation (1), the terminal optimizes the timer for cell reselection in step 520 The timer for cell reselection may be optimized by Equation (2) presented below:

$$Treselection\ after\ flooring = N \times DRX - m \times DRX \quad (2)$$

Treselection after flooring indicates a cycle of a timer for cell reselection after being optimized, N is a quotient which is obtained when the cycle of the timer for cell reselection is divided by DRX, and m is a margin coefficient, which is used for preventing an error and may be used to adjust an expiration time of the timer. The terminal examines measurement indexes and determines a condition after the timer for cell reselection expires, and then reselects a cell.

Figure 6:
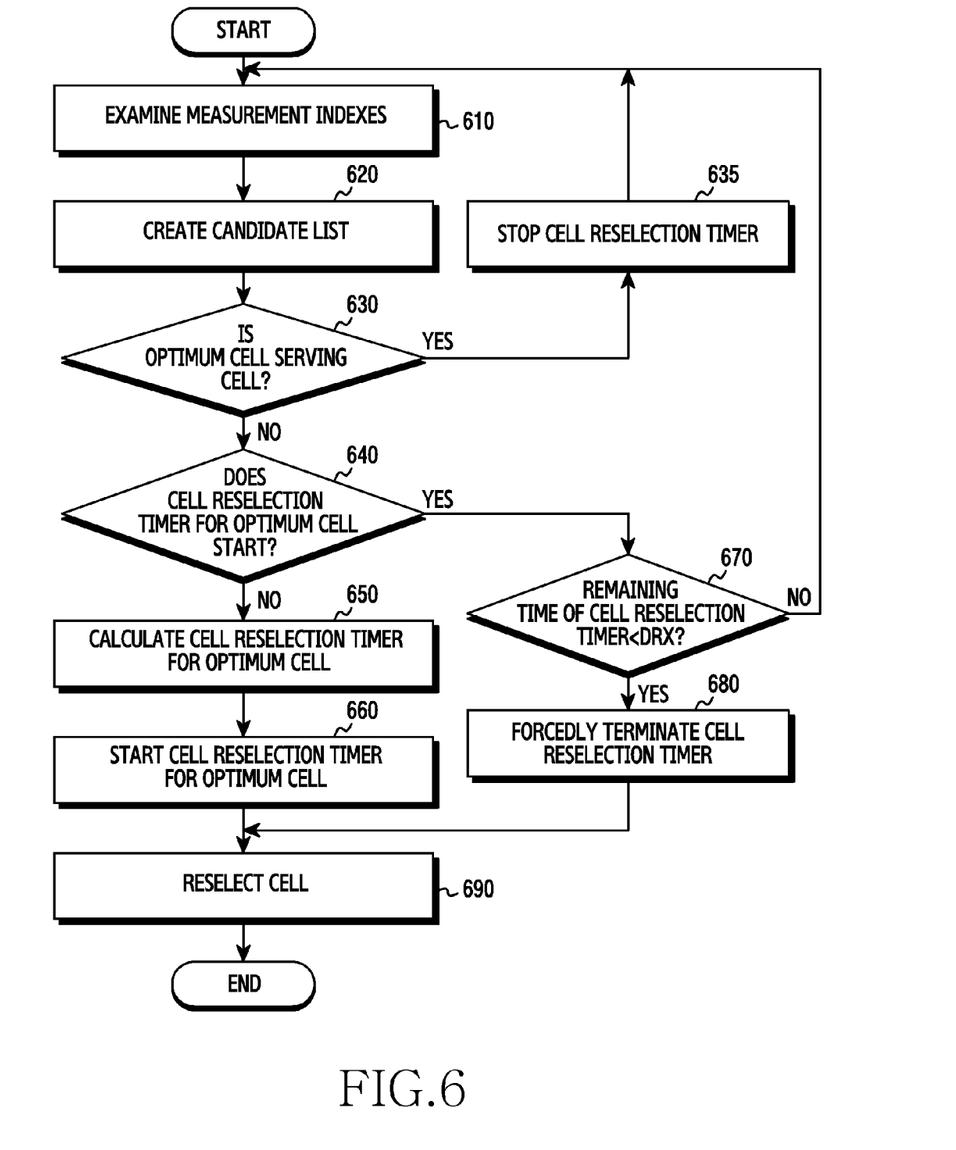
FIG. 6 is a flowchart illustrating a method for determining an expiration time of a timer for cell reselection, according to an embodiment of the present disclosure.

FIG. 6 is a flowchart illustrating a method for determining an expiration time of a timer for cell reselection, according to an embodiment of the present disclosure.

In step 610, the terminal examines measurement indexes. The terminal measures the quality of a serving cell and compares the quality and a parameter received from a network. When the quality is less than or equal to a reference value, the terminal examines measurement indexes regarding neighboring cells.

In step 620, the terminal ranks the serving cell and the neighbor cells according to the examined measurement indexes. The measurement index may utilize an index such as a strength and quality of signals and the terminal generates a candidate list according to the values of the examined measurement indexes. The top-ranked cell in the candidate list becomes a candidate cell for cell reselection.

In step 630, the terminal compares the ranking of the candidate cell and the ranking of the serving cell. When the ranking of the serving cell is higher than the ranking of the candidate cell, the terminal does not perform the cell reselection operation and maintains the current serving cell, and the method proceeds to step 635 to stop a timer for cell reselection. When the ranking of the serving cell is lower than the ranking of the candidate cell, the terminal selects the top-ranked candidate cell from among the candidate cells as an optimum cell in step 640.

In step 640, the terminal also determines whether the timer for cell reselection for the optimum cell starts. When the timer for cell reselection for the optimum cell does not start, the terminal proceeds to step 650 to calculate the timer for cell reselection for the optimum cell.

The timer for cell reselection is started in step 660, and the timer reselects a cell in step 690.

When the timer for cell reselection for the optimum cell starts, the terminal compares a length of a remaining time of the timer cycle for cell reselection at the current time and a length of a DRX cycle time in step 670. When the length of the remaining time of the timer cycle for cell reselection is greater than the length of the DRX cycle time, the terminal reselects a cell in the next DRX cycle, and, when the length of the remaining time of the timer cycle for cell reselection is less than the length of the DRX cycle time, the terminal proceeds to step 680 to terminate the timer for cell reselection and then proceeds to step 690 to reselect a cell.

Figure 7:
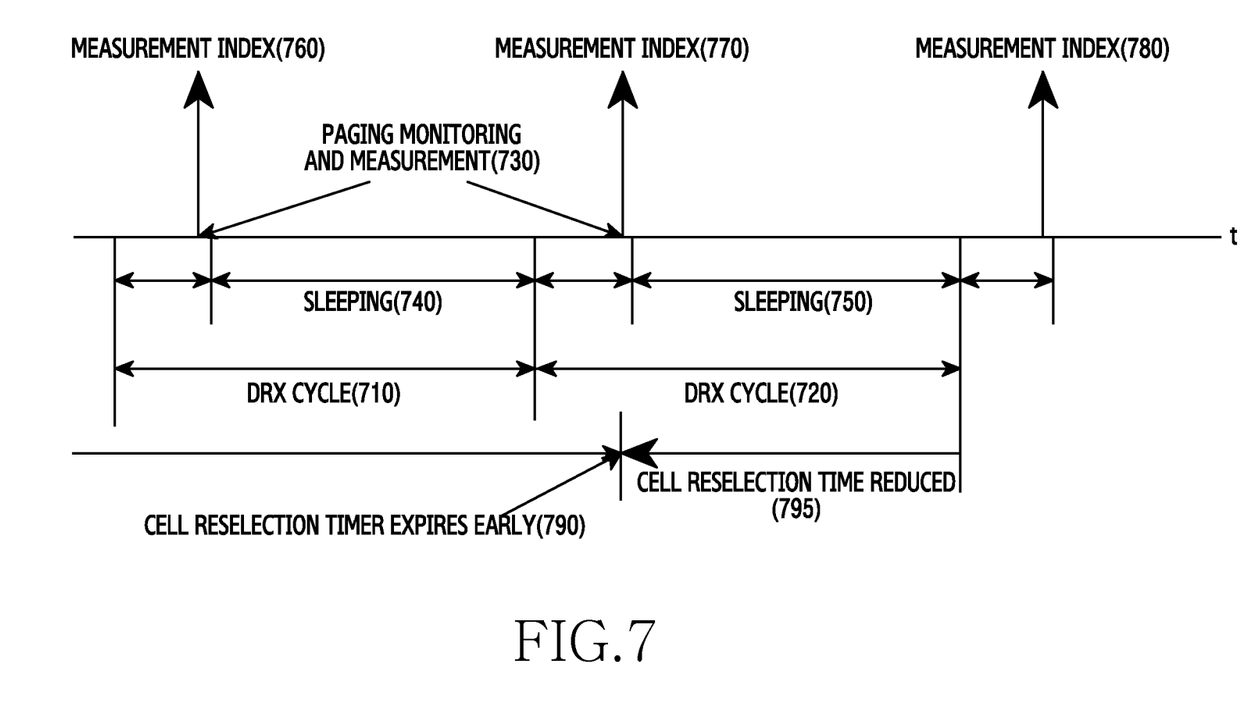
FIG. 7 is a diagram illustrating an example of an operation when a timer for cell reselection is forcedly terminated, according to an embodiment of the present disclosure.

FIG. 7 is a diagram illustrating an example of an operation when a timer for cell reselection is terminated early, according to an embodiment of the present disclosure.

Referring to FIG. 7, a correlation between two DRX cycles 710 and 720, two sleeping times 740 and 730, and three measurement index examining operations 760, 770, and 780 is illustrated.

Referring to FIG. 7, a timer 790 for cell reselection of the terminal is terminated early and thus expires after measurement index 770, during a wake-up time of the DRX cycle 720. Since measurement index 770 for cell reselection is examined before the timer 790 for cell reselection expires, the terminal reselects a cell. When the terminal does not terminate the timer for cell reselection, the terminal reselects a cell before third measurement index 780, after the second DRX cycle 720. Therefore, the time required to reselect a cell can be reduced by as much as a difference between the expiration time of the DRX 720 and the time of the measurement index 770 when the timer for cell reselection is terminated early in comparison with the case in which the timer is not terminated early. In FIG. 7, this reduction in time for reselecting a cell is illustrated by reference number 495.

Figure 8:
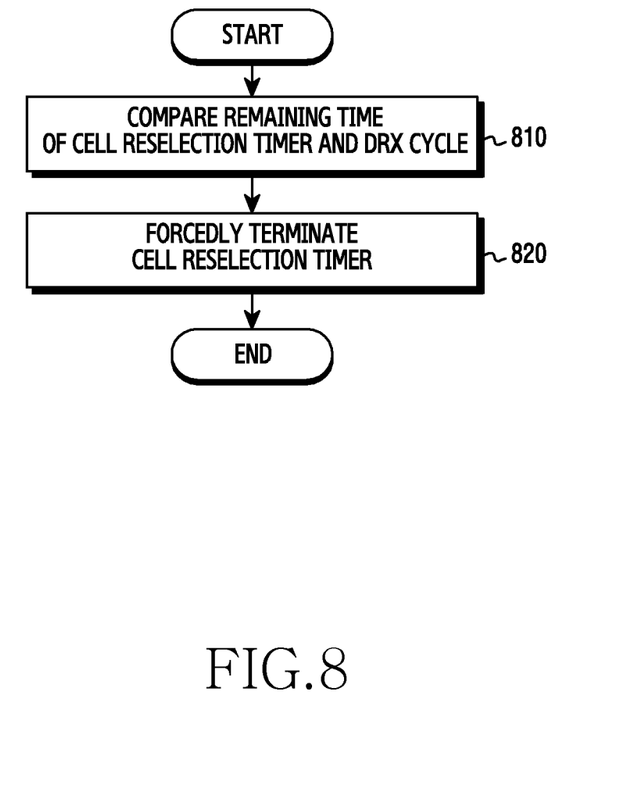
FIG. 8 is a flowchart illustrating a method for forcedly terminating a timer for cell reselection, according to an embodiment of the present disclosure.

FIG. 8 is a flowchart illustrating a method for forcedly terminating a timer for cell reselection, according to an embodiment of the present disclosure.

In step 810, the terminal compares a length of a remaining time of a current timer cycle for cell reselection and a length of a DRX cycle. When the result of comparing the length of the remaining time of the current timer cycle for cell reselection and the length of the DRX cycle satisfies Equation (3) presented below, the terminal proceeds to step 820 to forcedly terminate the timer for cell reselection:

$$\text{Remaining Time of } T\text{reselection} < DRX\text{cycle} \qquad (3)$$

Remaining Time of Treselection indicates a length of a remaining time of a timer cycle for cell reselection and DRXcycle indicates a DRX cycle. That is when a length of the remaining time of the timer cycle for cell reselection is less than the length of the DRX cycle, the terminal proceeds to step 820 to forcedly terminate the timer for cell reselection.

In step 820, the terminal forcedly terminates the timer for cell reselection. The terminal creates a candidate list according to measurement indexes, and, when the ranking of the candidate cell is greater than a serving cell and Equation (3) is satisfied, the terminal terminates the timer for cell reselection (expiration) and reselects a cell.

Figure 9:
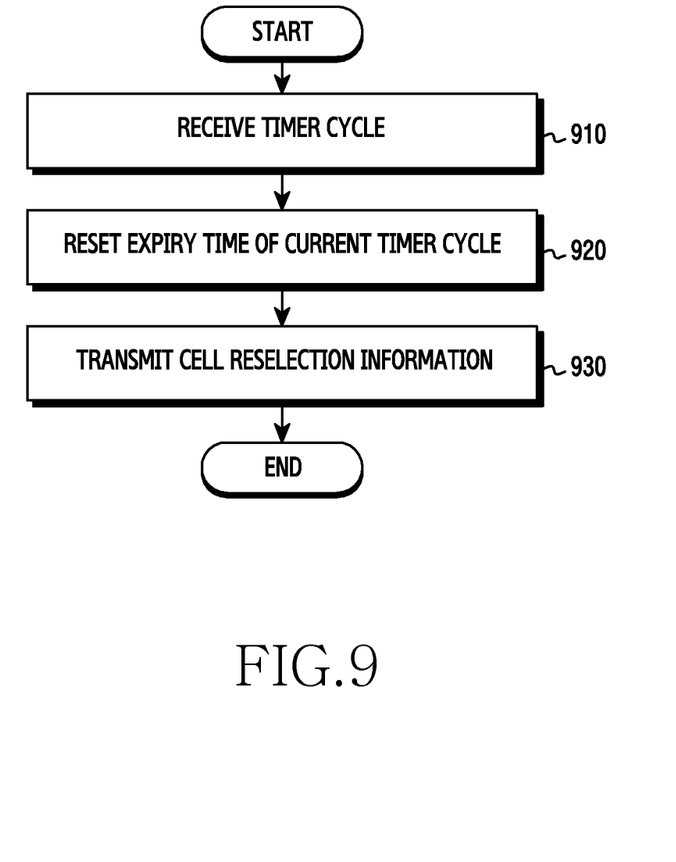
FIG. 9 is a flowchart illustrating a method for controlling a timer for cell reselection, according to an embodiment of the present disclosure.

FIG. 9 is a flowchart illustrating a method for controlling a timer for cell reselection, according to an embodiment of the present disclosure.

In step 910, the terminal receives a timer cycle for cell reselection. The timer for cell reselection is received from a network and is used to adjust a time for cell reselection.

In step 920, the terminal reconfigures the expiration time of the timer cycle. The terminal performs at least one of a process of correcting the cycle of the timer and a process of determining a time for cell reselection to reconfigure the expiration time of the timer cycle for cell reselection.

The terminal corrects the cycle of the timer for cell reselection when the cycle of the timer for cell reselection is greater than the DRX cycle. The cycle of the timer may be corrected by deducting a margin coefficient from a quotient, which is obtained by dividing the cycle of the timer for cell reselection by the cycle of the DRX, and then multiplying the result by the DRX. The terminal reselects a cell using the corrected cycle of the timer.

To determine the time for cell reselection, the terminal compares a remaining time of a current cycle of the timer and the DRX cycle time. When the length of the DRX cycle time is greater than the length of the remaining time of the current cycle of the timer, the terminal terminates the current timer and reselects a cell at the time when the timer is terminated.

In step 930, the terminal sets information for cell reselection. The terminal receives system information transmitted from a candidate cell, and the system information may include information on whether a Public Land Mobile Network (PLMN) is a target PLMN, whether a cell selecting condition is satisfied, and whether it is possible to reselect a cell. The terminal receives the system information, sets a DRX cycle, a neighbor cell, a cell reselection parameter, etc, according to a corresponding cell, sets a channel to receive paging according to the DRX cycle, and, when location information of the system (e.g., location area identifier) is changed, performs a location updating procedure, and reselects a cell.

Figure 10:
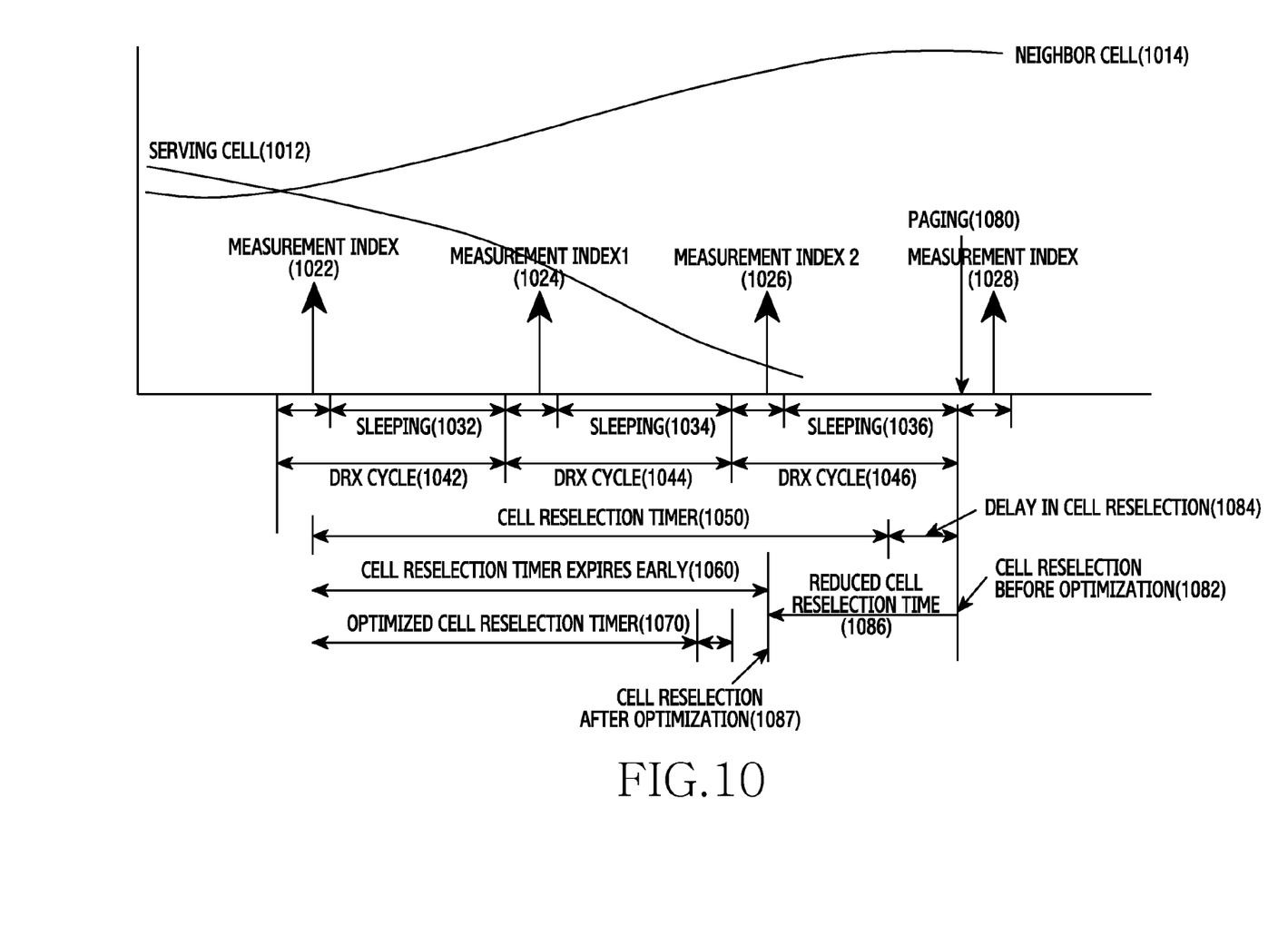
FIG. 10 is a diagram illustrating a method for controlling a timer for cell reselection according to the status of a serving cell and the status of a neighboring cell, according to an embodiment of the present disclosure.

FIG. 10 is a diagram illustrating a method for controlling a timer for cell reselection according to the status of a serving cell and the status of a neighboring cell, according to an embodiment of the present disclosure.

Referring to FIG. 10, a correlation between three DRX cycles 1042, 1044, and 1046, three sleeping times 1032, 1034, and 1036, and four measurement index examining operations 1022, 1024, 1026, and 1028 is illustrated.

In FIG. 10, a timer 150 for cell reselection, which is being controlled, reselects a cell at a time 1082 when an electric field of the serving cell falls, which is illustrated by reference number 1012.

When the timer for cell reselection is optimized, which is illustrated by reference numeral 1070, the timer for cell reselection expires at a time 1087 and reselects a neighboring cell, which is illustrated by reference numeral 1014, using a second measurement index examining operation 1026. Therefore, the time required to reselect a cell can be saved, as illustrated by reference numeral 1086.

In addition, when the timer for cell reselection expires early, which is illustrated by reference numeral 1060, the timer for cell reselection expires at a time 1088 and reselects the neighboring cell 1014 using a second measurement index examining operation 1026. Therefore, the time required to reselect a cell cart be saved, as illustrated by reference numeral 1086.

Figure 11:
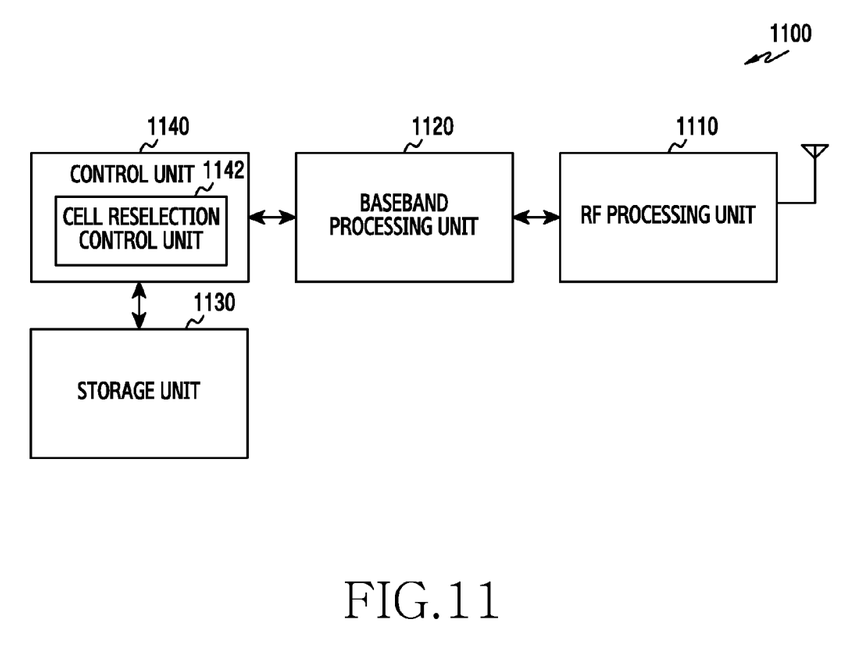
FIG. 11 is a block diagram showing a terminal, according to an embodiment of the present disclosure.

FIG. 11 is a block diagram illustrating a terminal 1100, according to an embodiment of the present disclosure.

Referring to FIG. 11, the terminal 100 includes a Radio Frequency (RF) processing unit 1110, a base band processing unit 1120, a storage unit 1130, a control unit 1140, and a cell reselection control unit 1142.

The RF processing unit 1110 transmits and receives signals via a wireless channel, such as signal band conversion, amplification, and the like. That is, the RF processing unit 1110 up-converts a baseband signal provided from the baseband processing unit 1120 into an RF band signal, transmits the RF band signal via an antenna, and down-converts an RF band signal received via the antenna into a baseband signal. For example, the RF processing unit 1110 may include a transmission filter, a reception filter, an amplifier, a mixer, an oscillator, a Digital to Analog Converter (DAC), an Analog to Digital Converter (ADC), and the like. In FIG. 11, a single antenna is illustrated but the transmitting end may include a plurality of antennas.

The baseband processing unit 1120 converts a baseband signal into a bit string according to a physical layer standard of a particular system. For example, when transmitting data, the baseband processing unit 1120 generates complex symbols by encoding and modulating transmission bit strings. In addition, when receiving data, the baseband processing unit 1120 restores reception bit strings by demodulating and decoding baseband signals provided from the RF processing unit 1110. For example, according to the Orthogonal Frequency Division Multiplexing (OFDM) method, when transmitting data, the baseband processing unit 1120 generates the complex symbols by encoding and modulating the transmission bit strings, maps the complex symbols onto sub carriers, and configures OFDM symbols by performing an Inverse Fast Fourier Transform (IFFT) operation and inserting a cyclic prefix (CP). In addition, when receiving data, the baseband processing unit 1120 divides the baseband signal provided from the RF processing unit 1110 on an OFDM symbol basis, restores the signals which have been mapped onto sub carriers through the Fast Fourier Transform (FFT) operation, and restores reception bit stings by demodulating and decoding. The baseband processing unit 1120 and the RF processing unit 1110 transmits and receives the signals as described above. Accordingly, the baseband processing unit 1120 and the RF processing unit 1110 may be referred to as a transmitting unit, a receiving unit, a transmitting and receiving unit, or a communication unit.

The storage unit 1130 stores data such as basic programs, application programs, and setting information for operations of an apparatus for controlling a transfer rate. In particular, the storage unit 1130 stores information related to a cycle of a timer for cell reselection and a changed cycle. In addition, the storage unit 1130 provides stored data according to a request of the control unit 1140.

The control unit 1140 controls the overall operation of the terminal 1100 for controlling the timer for cell reselection. For example, the control unit 1140 transmits signals via the baseband processing unit 1120 and the RF processing unit 1310 and connects the terminal to a base station. In addition, the control emit 1140 may include the cell reselection control unit 1142. For example, the cell reselection control unit 1143 controls the terminal for controlling the timer for cell reselection to perform the procedures shown in FIGS. 1-10.

The control unit 1140 performs at least one of a process of correcting the cycle of the timer and a process of determining a time for cell reselection. For example, the control unit 1140 compares the cycle of the timer for cell reselection and a DRX cycle and corrects the cycle of the timer for cell reselection. To determine the time for cell reselection, the control unit 1140 compares a remaining time of a current cycle of the timer and the DRX cycle time. The control unit 1140 reselects a cell according to the corrected cycle of the timer or reselects a cell at the determined time.

In accordance with the present disclosure, the terminal 1100 is capable of determining an expiration time of a timer for cell reselection or optimizing the timer for cell reselection, and, thus, a time required to reselect a cell can be reduced and a paging reception rate can be improved, thereby overcoming the aforementioned shortcomings of conventional cell reselection processes. In addition, a delay in cell reselection can be reduced by optimizing a timer for cell reselection, as described above.

A method for operating of a terminal in a communication system, the method comprises receiving timer information for cell reselection, reconfiguring art expiry time of a current cycle of the received timer for cell reselection, and setting information for cell reselection at the reconfigured expiry time of the current cycle of the timer for cell reselection. The reconfigured timer cycle for cell reselection is shorter than a timer cycle for cell reselection before being reconfigured. The reconfiguring the expiry time comprises: performing at least one of a process of correcting the cycle of the timer for cell reselection and a process of forcedly terminating the timer for cell reselection. The correcting the cycle is performed when the cycle of the timer for cell reselection is longer than a DRX cycle. The correcting the cycle of the timer comprises deducting a margin coefficient from a quotient which is obtained by dividing the cycle of the timer for cell reselection by a cycle of DRX and then multiplying a result of the deducting by the DRX. The forcedly terminating the timer for cell reselection is performed when a length of a remaining time of the current cycle of the timer is shorter than a length of a DRX cycle time. The timer for cell reselection is forcedly terminated at a same time as a time at which a cell is reselected. The setting the information for cell reselection comprises setting at least one piece of information of a DRX cycle, a neighbor cell, and a cell reselection parameter to correspond to a cell to be reselected. The method further comprises receiving system information from a candidate cell, and the system information comprises information on whether a PLMN is a target PLMN, information on whether a cell selecting condition is satisfied or not, and information on whether it is possible to reselect a candidate cell. The method further comprises setting a channel to receive paging according to a DRX cycle.

A terminal in a communication system comprises a receiver configured to receive timer information for cell reselection and a controller configured to reconfigure an expiry time of a current cycle of the received timer for cell reselection, and set information for cell reselection at the reconfigured expiry time of the current cycle of the timer for cell reselection. The reconfigured timer cycle for cell reselection is shorter than a timer cycle for cell reselection before being reconfigured. The controller is configured to reconfigure the expiry time by performing at least one of a process of correcting the cycle of the timer for cell reselection and a process of forcedly terminating the timer for cell reselection. The controller is configured to correct the cycle when the cycle of the timer for cell reselection is longer than a DRX cycle. The controller is configured to correct the cycle of the timer by deducting a margin coefficient from a quotient which is obtained by dividing the cycle of the timer for cell reselection by a cycle of DRX and then multiplying a result of the deducting by the DRX. The controller is configured to forcedly terminate the timer for cell reselection when a length of a remaining time of the current cycle of the timer is shorter than a length of a DRX cycle time. The timer for cell reselection is forcedly terminated at a same time as a time at which a cell is reselected. The controller is configured to set at least one piece of information of a DRX cycle, a neighbor cell, and a cell reselection parameter to correspond to a cell to be reselected. The receiver is configured to receive system information from a candidate cell, and the system information comprises information on whether a PLMN is a target PLMN, information on whether a cell selecting condition is satisfied or not, and information on whether it is possible to reselect a candidate cell. The controller is configured to set a channel to receive paging according to a DRX cycle.

Methods based on the embodiments disclosed in the claims and/or specification of the present disclosure can be implemented in hardware, software, or a combination of both.

When implemented in software, a nontransitory computer readable recording medium for storing one or more programs (i.e., software modules) can be provided. The one or more programs stored in the nontransitory computer readable recording medium are configured for execution performed by one or more processors in an electronic device, e.g., the to signal 1100. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM). Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access an electronic device performing the embodiments of the present disclosure. In addition, a separate storage device on a communication network may access electronic device performing the embodiment of the present disclosure.

In the above-described embodiments, the elements included in the present disclosure are expressed in a singular form or a plural form according to an exemplary embodiment. However, the singular form or plural form is only selected to correspond to a situation suggested for convenience of explanation and the present disclosure is not limited to a single element or a plurality of elements, and the elements expressed in the plural form may be configured as a single element or the element expressed in the singular form may be configured as plural elements.

While the present disclosure has been shown and described with reference to certain embodiments thereof, it should be understood by those skilled in the art that many variations and modifications of the method and apparatus described herein will still fall within the scope of the present disclosure as defined in the appended claim and their equivalents.

What is claimed is:

1. A method for operating of a terminal in a communication system, the method comprising:
    determining information regarding a quality of a signal received from a base station;
    determining to perform a cell reselection based on the information;
    if performing the cell reselection is determined at a timing when a timer for performing the cell reselection is in progress, ceasing the timer when a remaining interval until an expiry of the timer is shorter than a discontinuous reception (DRX) cycle; and
    if performing the cell reselection is determined at a timing when a timer for the cell reselection is not in progress, determining a current cycle of the timer as the DRX cycle multiplied by a difference between a value derived from a previous cycle of the timer and a coefficient value.

2. The method of claim 1, wherein the coefficient value is used for preventing an error.

3. The method of claim 1, further comprising:
    performing the cell reselection from a serving cell to a target cell.

4. The method of claim 3, wherein the current cycle of the timer is determined when the previous cycle of the timer is greater than the DRX cycle.

5. The method of claim 3, wherein determining the current cycle of the timer comprises:
    obtaining a result by deducting a margin coefficient from a quotient, which is obtained by dividing the previous cycle of the timer by the DRX cycle, and
    determining the current cycle of the timer by multiplying the result and the DRX cycle,
    wherein the margin coefficient corresponds to the coefficient value.

6. The method of claim 3, wherein performing the cell reselection comprises:
    receiving system information regarding the target cell; and
    performing the cell reselection based on the system information.

7. The method of claim 3, wherein the cell reselection is performed in response to the ceasing of the timer.

8. An apparatus of a terminal in a communication system, the apparatus comprising:
    a receiver; and
    at least one processer operatively coupled to the receiver, wherein the at least one processor is configured to:
        determine information regarding a quality of a signal received from a base station via the receiver;
        determine to perform a cell reselection based on the information;
        if performing the cell reselection is determined at a timing when a timer for the cell reselection is in progress, cease the timer when a remaining interval until an expiry of the timer is shorter than a discontinuous reception (DRX) cycle; and
        if performing the cell reselection is determined at a timing when a timer for the cell reselection is not in progress, determine a current cycle of the timer as the DRX cycle multiplied by a difference between a value derived from a previous cycle of the timer and a coefficient value.

9. The terminal of claim 8, wherein the coefficient value is used for preventing an error.

10. The terminal of claim 8, wherein the at least one processor is further configured to perform the cell reselection from a serving cell to a target cell.

11. The terminal of claim 10, wherein the current cycle of the timer is determined when the previous cycle of the timer is greater than the DRX cycle.

12. The terminal of claim 10, wherein the at least one processor, in order to determine the current cycle, is configured to:
    obtain a result by deducting a margin coefficient from a quotient, which is obtained by dividing the previous cycle of the timer by the DRX cycle, and
    determine the current cycle of the timer by multiplying the result and the DRX cycle time,
    wherein the margin coefficient corresponds to the coefficient value.

13. The terminal of claim 10, wherein the at least one processor, in order to perform the cell reselection, is configured to:
    receive system information regarding the target cell; and
    perform the cell reselection based on the system information.

14. The terminal of claim 10, wherein the cell reselection is performed in response to the ceasing of the timer.

15. The terminal of claim 10, wherein the at least one processor is configured to perform the reselection based on information of at least one of a DRX cycle, a neighboring cell, and a cell reselection parameter regarding the target cell.

16. A System on Chip (SoC) for reselecting a cell of a terminal in a communication system, the SoC comprising:
    a receiver module; and
    a controller module configured to:
        determine information regarding a quality of a signal received from a base station via the receiver module;
        determine to perform a cell reselection based on the information;
        if performing the cell reselection is determined at a timing when a timer for performing the cell reselection is in a progress, cease the timer when a remaining interval until an expiry of the timer is shorter than a discontinuous reception (DRX) cycle; and
        if performing the cell reselection is determined at a timing when a timer for cell reselection is not in progress, determine a current cycle of the timer as the DRX cycle multiplied by a difference between a value derived from a previous cycle of the timer and a coefficient value.

17. The SoC of claim 16, wherein the coefficient value is used for preventing an error.

18. The SoC of claim 16, wherein the controller module is further configured to perform the cell reselection from a serving cell to a target cell.

19. The SoC of claim 18, wherein the current cycle of the timer is determined when the previous cycle of the timer is greater than the DRX cycle.

20. The SoC of claim 19, wherein the controller module is configured to:
   obtain a result by deducting a margin coefficient from a quotient, which is obtained by dividing the previous cycle of the timer by the DRX cycle, and
   determine the current cycle of the timer by multiplying the result and the DRX cycle,
   wherein the margin coefficient corresponds to the coefficient value.

* * * * *